(12) United States Patent
Kim et al.

(10) Patent No.: US 7,345,979 B2
(45) Date of Patent: Mar. 18, 2008

(54) STORAGE MEDIUM STORING COPY PROTECTION DATA IN BURST CUTTING AREA USING THE ON-OFF KEYING MODULATION METHOD

(75) Inventors: Jin-han Kim, Gyeonggi-do (KR); Jae-seong Shim, Seoul (KR); Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 543 days.

(21) Appl. No.: 10/878,555

(22) Filed: Jun. 29, 2004

(65) Prior Publication Data

US 2005/0047295 A1 Mar. 3, 2005

(30) Foreign Application Priority Data

Aug. 25, 2003 (KR) ............ 10-2003-0058894

(51) Int. Cl.
*G11B 5/09* (2006.01)
(52) U.S. Cl. .................................... 369/59.25
(58) Field of Classification Search .......... None
See application file for complete search history.

(56) References Cited

U.S. PATENT DOCUMENTS

| | | | | |
|---|---|---|---|---|
| 5,708,640 | A * | 1/1998 | Fukuda et al. | 369/47.17 |
| 6,343,062 | B1 * | 1/2002 | Furukawa et al. | 369/275.4 |
| 6,414,920 | B1 | 7/2002 | Lee | |
| 6,507,558 | B2 * | 1/2003 | Aoki | 369/275.3 |
| 6,519,213 | B1 * | 2/2003 | Song et al. | 369/44.26 |
| 6,728,181 | B2 * | 4/2004 | Shimoda et al. | 369/53.2 |
| 6,877,117 | B1 * | 4/2005 | Childers et al. | 714/704 |
| 7,002,895 | B1 * | 2/2006 | Taussig | 369/275.1 |
| 7,006,415 | B2 * | 2/2006 | Hou et al. | 369/52.1 |
| 7,133,622 | B2 * | 11/2006 | Winzer | 398/188 |
| 7,221,637 | B2 * | 5/2007 | Arioka et al. | 369/59.25 |
| 2002/0060968 | A1 * | 5/2002 | Senshu | 369/59.25 |
| 2003/0112862 | A1 | 6/2003 | Joe et al. | |
| 2003/0137913 | A1 | 7/2003 | Oshima et al. | |
| 2004/0213579 | A1 * | 10/2004 | Chew et al. | 398/183 |

FOREIGN PATENT DOCUMENTS

| | | |
|---|---|---|
| JP | 2000-228062 | 8/2000 |
| JP | 2000-243037 | 9/2000 |

\* cited by examiner

*Primary Examiner*—Andrea Wellington
*Assistant Examiner*—Michael V Battaglia
(74) *Attorney, Agent, or Firm*—Stein, McEwen & Bui, LLP

(57) ABSTRACT

In order to protect copyrighted data on a disk, a method and apparatus for generating a burst cutting area (BCA) on a disk to prevent unauthorized copy, and an information storage medium having a BCA are provided. The information storage medium comprises: a user data recording area; and a burst cutting area (BCA) on which control information is modulated by using on-off keying (OOK) modulation and recorded. According to the method and apparatus, channel bits after BCA data modulation are generated by inserting a start pattern to data bits before modulation such that a separate modulation table is not needed. Accordingly, the recording density in the BCA increases and by using the start pattern, a sync pattern distinguishable from data is generated and can be used as a signal for a phase locked loop (PLL) when data is restored.

12 Claims, 6 Drawing Sheets

| SYNC SIGNAL | SYNC PATTERN ||||
|---|---|---|---|---|
| | SYNC BODY | SYNC ID |||
| | CHANNEL BIT $C_{11}\ C_{10}\ C_9\ C_8\ C_7\ C_6$ | CHANNEL BIT $C_5\ C_4\ C_3\ C_2\ C_1\ C_0$ | DATA BIT $b_3\ b_2\ b_1\ b_0$ ||
| $Sync_0$ | 1 0 0 0 0 1 | 1 0 0 1 0 0 | 0 0 0 0 ||
| $Sync_1$ | 1 0 0 0 0 1 | 1 0 0 1 0 0 | 0 0 0 1 ||
| $Sync_2$ | 1 0 0 0 0 1 | 1 0 0 1 1 0 | 0 0 1 0 ||
| ⋮ | ⋮ | ⋮ | ⋮ ||
| $Sync_i$ | 1 0 0 0 0 1 | 1 x x 1 x x | i ||
| ⋮ | ⋮ | ⋮ | ⋮ ||
| $Sync_{15}$ | 1 0 0 0 0 1 | 1 1 1 1 1 1 | 1 1 1 1 ||

STORAGE MEDIUM STORING COPY PROTECTION DATA IN BURST CUTTING AREA USING THE ON-OFF KEYING MODULATION METHOD

CROSS-REFERENCE TO RELATED APPLICATION

This application claims priority from Korean Patent Application No. 2003-28804, filed on Aug. 25, 2003 in the Korean Intellectual Property Office, the -disclosure of which are incorporated herein by reference.

BACKGROUND OF THE INVENTION

1. Field of the Invention

The present invention relates to protection of copyrighted data on a disk, and more particularly, to a method and apparatus for generating a burst cutting area (BCA) on a disk to prevent unauthorized copying, and an information storage medium having the BCA.

2. Description of the Related Art

As write-once disks or rewritable disks are widely used, copyrighted data may be copied illegally. In order to prevent illegal copy of a disk, there is a burst cutting area (BCA) in a digital versatile disk (DVD). FIG. 1 is a diagram showing a BCA of a DVD 10. Referring to FIG. 1, it can be seen that a BCA 20 is formed along the innermost track of the DVD 10 corresponding to an angle of about 330 degrees. The BCA 20 of a DVD-read only memory (ROM) or a DVD-random access memory (RAM) is formed when the DVD 10 is manufactured in a factory. By applying a pulse laser light of yttrium-aluminum-garnet (YAG) to the DVD 10, a stripe of a reflection film, which is formed inside of the DVD 10 and is made of aluminum and so on, is removed in a radial shape such that a stripe (barcode) is formed along the innermost track. Here, the stripe indicates, for example, an identification (ID) number and other identification information and additional information such as an encryption key.

FIG. 2 is a diagram to explain phase encode (PE) modulation. Referring to FIG. 2, phase modulation in which data bits change according to the locations of a mark and a space is shown. Referring to FIGS. 4A and 4B to be explained later, data bit "0" is converted into channel bit "10", and data bit "1" is converted into channel bit "01".

FIGS. 3A and 3B are diagrams showing examples of a frame sync pattern used in the PE modulation of FIG. 2. In the PE modulation, channel bits changes at the center of two channel bits indicating a data bit, and therefore, marks or spaces do not occur continuously for 3 or more channel bits in the case of data bits. Accordingly, a sync pattern indicating a sync bit (frame sync) can be formed by arranging continuous marks or continuous spaces in 3 or more channel bits.

FIGS. 4A and 4B are diagrams showing an example of modulating disk ID data bits by using 4-1 modulation. The 4-1 modulation is a method to modulate 2-bit data into 7 channel bits. The first 3 channel bits form a sync part expressed as "010", and the following 4 channel bits form a data part in which data is represented by a position of "1" changing within the 4 channel bits. When 2 data bits before modulation are "00", "01", "10", and "11", the data parts are "1000", "0100", "0010", and "0001", respectively. The 7 channel bits obtained by adding the sync part and the data part and it become a word.

FIGS. 5A and 5B are diagrams showing an example of a sync pattern of a frame sync used in the 4-1 modulation of FIGS. 4A and 4B. In the 4-1 modulation, the position of logic "1" is fixed in the sync part of 3 channel bits. Accordingly, the interval of every second logic "1" occurring in a sync part is always 7. Therefore, a sync pattern can be formed by breaking the regularity of interval of every second logic "1".

However, as the size of a disk is continuously decreasing, and therefore a starting radius for recording or reproducing data is also decreasing, the recording density of a BCA at an inner side of an optical disc should be increased.

SUMMARY OF THE INVENTION

An aspect of the present invention provides a data modulation method and apparatus capable of increasing the recording density in a BCA in an optical disc, and a recording medium storing BCA data.

According to an aspect of the present invention, there is provided an information storage medium comprising: a user data recording area; and a burst cutting area (BCA) on which control information is modulated by on-off keying (OOK) modulation and recorded.

According to an aspect of the invention, the information storage medium, a signal generated in the OOK modulation method is a return-to-zero (RZ) signal.

According to another aspect of the present invention, there is provided a data modulation method comprising: generating control information modulated by OOK modulation method; and recording the generated control information on a BCA.

According to still another aspect of the present invention, there is provided a recording apparatus comprising: a control unit which generates control information modulated by using OOK modulation method; and a recording unit which records information generated by the control unit on a BCA formed on an optical disk.

According to yet still another aspect of the present invention, there is provided a reproducing apparatus comprising: a reading unit which reads out control information generated by using OOK modulation method, from a BCA of an optical disk; and a control unit which interprets information read by the reading unit, and based on the interpreted information, records user data on the optical disk or reproduces user data recorded on the optical disk.

According to still another aspect of the present invention, there is provided a computer readable recording medium having embodied thereon a program to execute the method.

Additional aspects and/or advantages of the invention will be set forth in part in the description which follows and, in part, will be obvious from the description, or may be learned by practice of the invention.

BRIEF DESCRIPTION OF THE DRAWINGS

The above aspects and/or advantages of the present invention will become more apparent by describing in detail preferred embodiments thereof with reference to the accompanying drawings in which:

FIG. 7 is a diagram of the data structure of a frame sync used in the OOK-RZ modulation of FIG. 6A-6C according to an aspect of the invention;

DETAILED DESCRIPTION OF THE EMBODIMENTS

Figure 1:
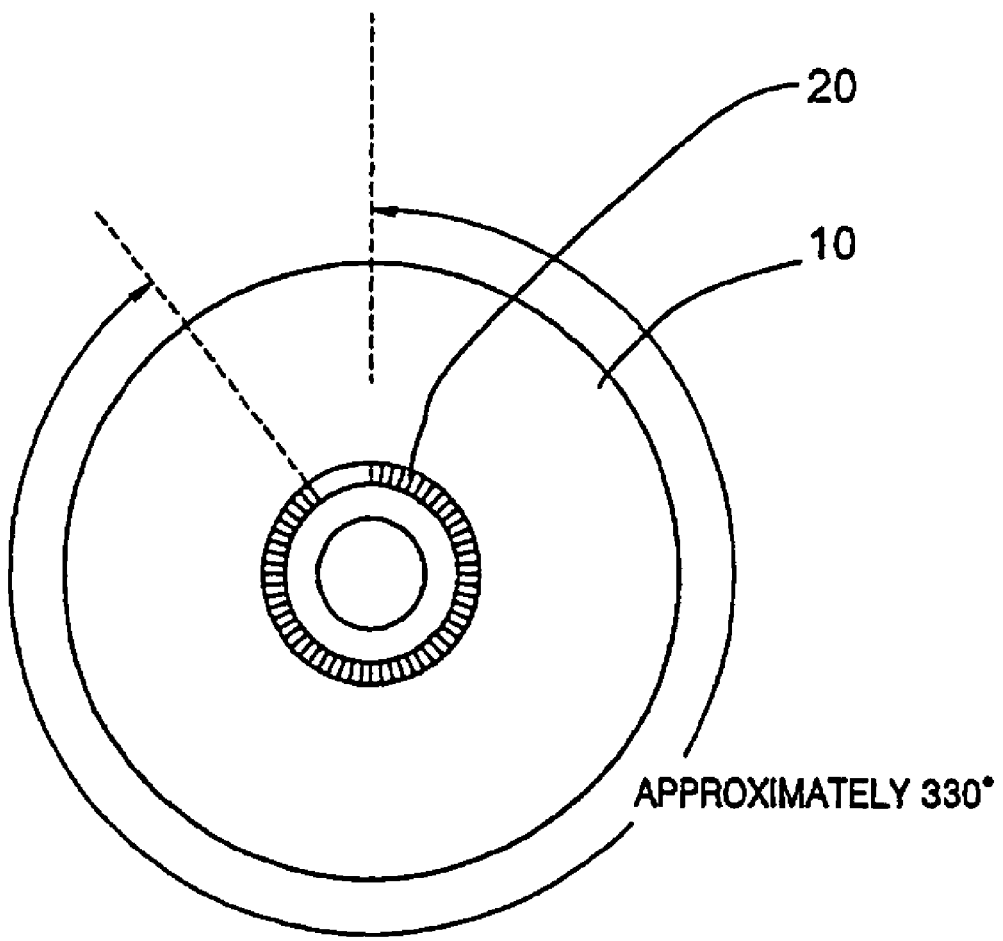
FIG. 1 is a diagram showing a bursting cutting area (BCA) of a digital versatile disk (DVD)
Figure 2:
FIG. 2 is a diagram to explain phase encode (PE) modulation.
Figure 2:
Figure 3A:
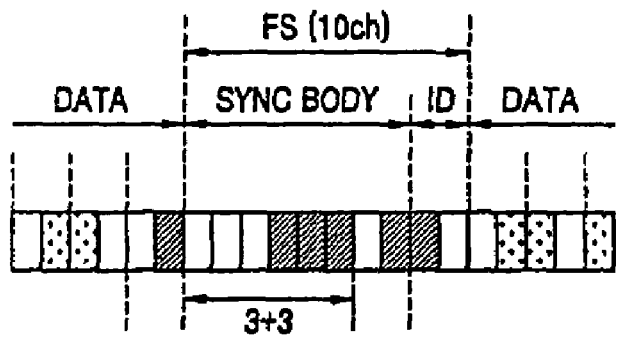
FIGS. 3A and 3B are diagrams showing examples of a frame sync pattern used in the PE modulation of FIG. 2.
Figure 3B:
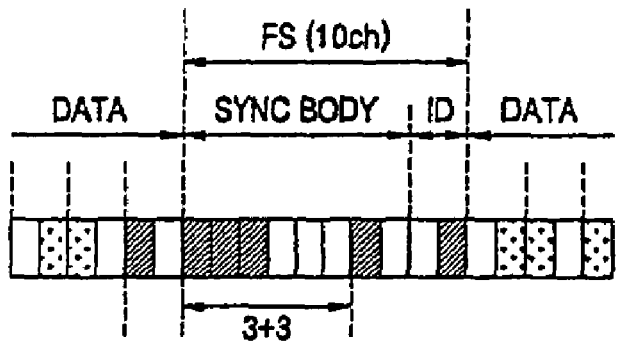
Figures 4A, 4B:
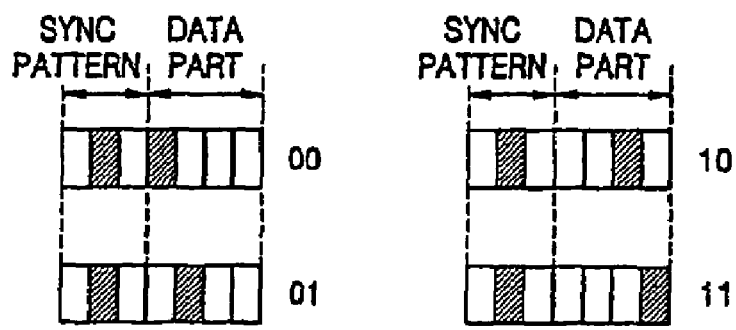
FIGS. 4A and 4B are diagrams showing an example of modulating disk ID data bits by using 4-1 modulation.
Figure 5A:
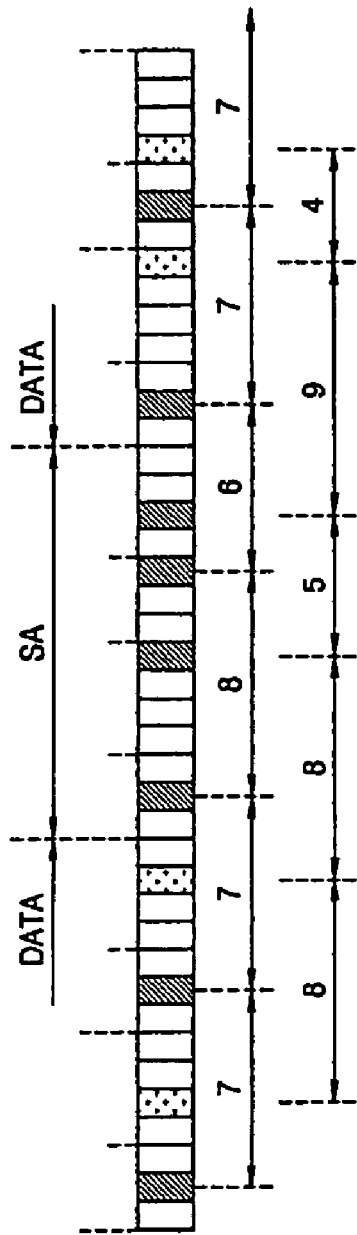
FIGS. 5A and 5B are diagrams showing an example of a sync pattern of a frame sync used in the 4-1 modulation of FIG. 4.
Figure 5B:
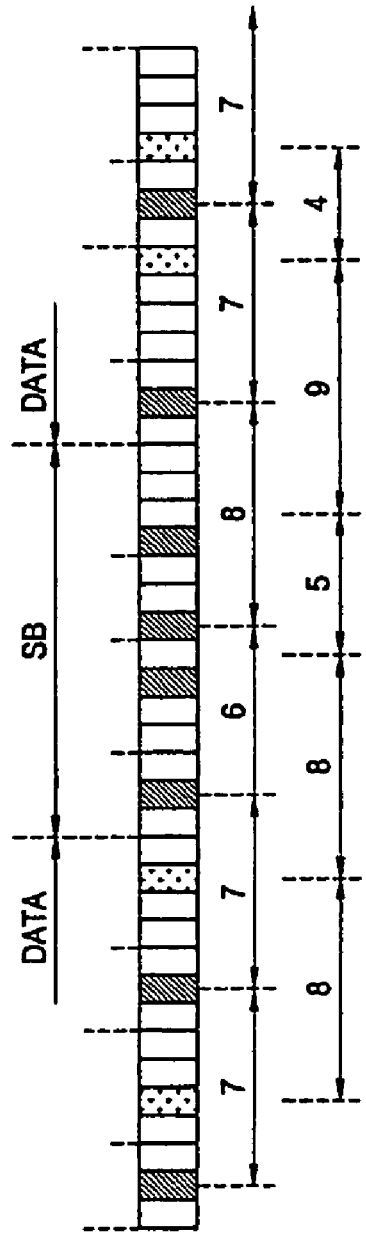

Reference will now be made in detail to the embodiments of the present invention, examples of which are illustrated in the accompanying drawings, wherein like reference numerals refer to the like elements throughout. The embodiments are described below to explain the present invention by referring to the figures.

Since an area at an inner side of a disk on which BCA data that is recorded decreases due to the need of a small-sized medium, the recording density of BCA data should be increased. In order to increase the recording density of data in a burst butting area (BCA), data can be recorded in the BCA by using on-off keying (OOK) method and a return-to-zero (RZ) signal as the data modulation method.

Figure 6A:
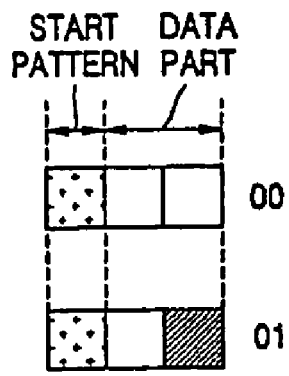
FIGS. 6A and 6B are diagrams showing examples of on-off keying and return-to-zero (OOK-RZ) modulation according to aspects of the invention.
Figure 6B:
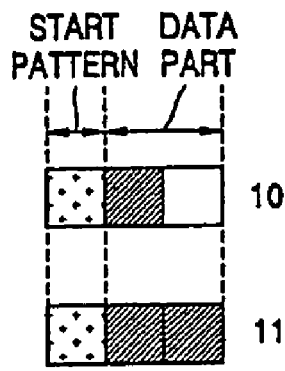

FIGS. 6A and 6B are diagrams showing examples of an OOK-RZ modulation method according to an aspect of the invention.

In the OOK-RZ modulation method, 2-bit data is modulated into 3 channel bits. The first channel bit forms a start pattern indicating that a 2-bits-long data word begins, and the following 2 channel bits form a data part representing 2-bit data.

The start pattern prevents a channel bit "0" or "1" from continuously repeating in 3 or more channel bits such that a sync pattern is distinguished. The start pattern can also be used for PLL purpose to restore BCA data according to an aspect of the invention. In addition, only adding the start pattern in front of 2-bit data is needed, and a separate modulation table is not needed such that the implementation becomes easier according to an aspect of the invention. However, it is understood that some form of the modulation table can be used according to aspects of the invention.

When a start pattern after modulation is "1", if 2-bit data before modulation are "00", "01", "10", and "11", then channel bits after modulation are "100", "101", "110", and "111", respectively.

Figure 6C:
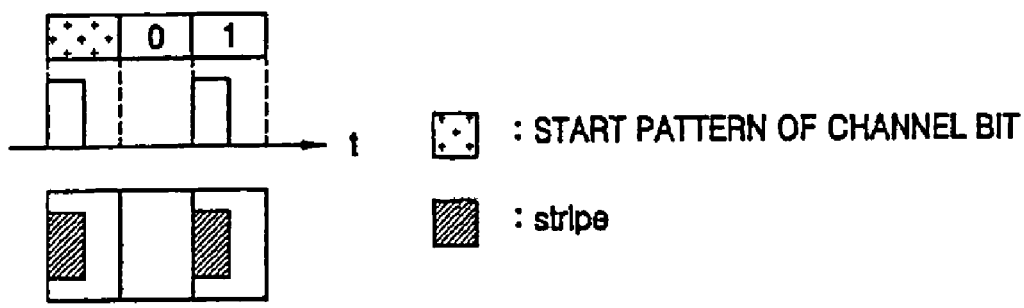
FIG. 6C is a diagram showing an example of recording data on a BCA by forming a stripe for channel bit "1" by using the OOK-RZ method according to an aspect of the invention.

FIG. 6C is a diagram showing an example of recording data on a BCA by forming a stripe for channel bit "1" by using the OOK-RZ method.

In the OOK-RZ modulation, a start pattern of channel bit "1" is inserted in front of 2 channel bits indicating data bits. Accordingly, in the case of data bits, "0" does not continuously occur in 3 or more channel bits. Therefore, a sync pattern indicating a sync bit (frame sync) can be formed by continuously arranging "0's" in 3 or more channel bits.

FIG. 7 is a diagram of the data structure of a frame sync used in the OOK-RZ modulation of FIG. 6A-6C. In FIG. 7, a sync body may also be set to be "100010". Also, if a start pattern is expressed by channel bit "0" in FIGS. 6a and 6b, then, in the case of data bits, channel bit "1" does not continuously occur in 3 or more channel bits according to aspects of the invention.

Accordingly, a sync pattern indicating a sync bit may also be formed by continuously arranging channel bit "1" in 3 or more channel bits. That is, synch of FIG. 7 can be expressed as "011110000000". FIG. 7 shows the case of start pattern is "1". But in the case that the start pattern is "0", the sync body should be "011110" by inverting the value of sync body "100001" in FIG. 7. Therefore, if a start pattern is "0" and channel bit of sync ID is "000000", then the sync can be expressed as "011110000000.

Figure 8:
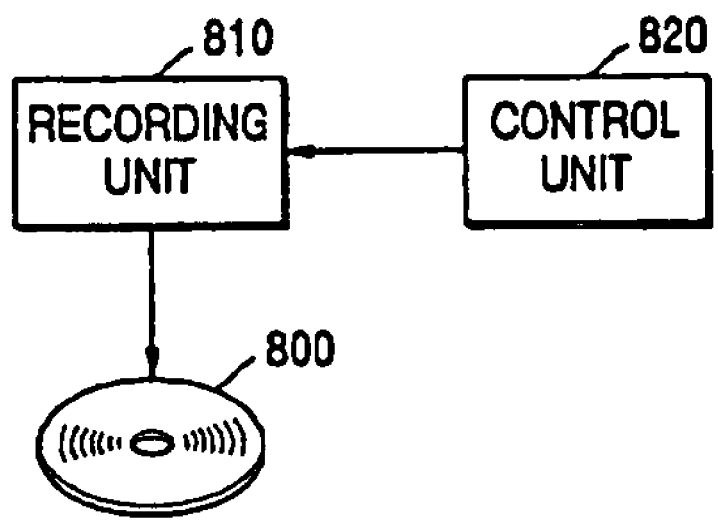
FIG. 8 is a block diagram of a BCA data recording and/or reproducing apparatus according to an aspect of the present invention.

FIG. 8 is a block diagram of a BCA data recording apparatus according to an aspect of the present invention. Referring to FIG. 8, the recording apparatus comprises a recording unit 810 and a control unit 820 in order to record BCA data generated by the method described above, in a BCA formed on an optical disk 800 according to an aspect of the present invention. By using the modulation method of an aspect of the present invention to record data in the BCA, the control unit 820 generates control information (for example, tracking polarity information and/or reflection ratio information), and records at least one of the control information in the BCA of the optical disk 800. Accordingly, in the BCA of the optical disk 800, control information generated according to an aspect of the present invention (for example, tracking polarity information and/or reflection ratio information) is recorded.

Figure 9:
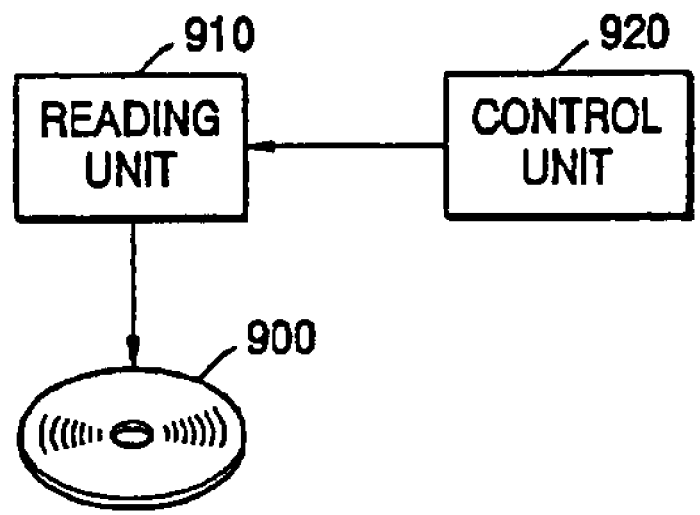
FIG. 9 is a block diagram of a recording and/or reproducing apparatus according to an embodiment of the present invention.

FIG. 9 is a block diagram of a reproducing apparatus according to an embodiment of the present invention. Referring to FIG. 9, the reproducing apparatus comprises a reading unit 910 and a control unit 920. The reading unit 910 reads out control information generated according to the modulation method of an aspect of the present invention, from the BCA arranged in an optical disk 900 according to the present invention, and provides the information to the control unit 920. The control unit 920 interprets control information provided by the reading unit 910 and based on the interpreted information, reproduces user data recorded on the optical disk 900.

While the recording apparatus of FIG. 8 indicates an apparatus used in a mastering process by a disk maker, "reproducing" in the reproducing apparatus of FIG. 9 means only reproduction of tracking polarity information and/or reflection ratio information from the BCA. However, it is understood that the user may mount the apparatus in FIGS. 8 or 9 on any one of a recording apparatus and a reproducing apparatus. This is because the process reproducing tracking polarity information and/or reflection ratio information from the BCA is performed when data is recorded and/or reproduced.

The invention can also be embodied as computer readable codes on at least one computer readable recording medium. The computer readable recording medium is any data storage device that can store data which can be thereafter read by a computer and/or a system of computers. Examples of the computer readable recording medium include read-only memory (ROM), random-access memory (RAM), CD-ROMs, DVDs, magnetic tapes, floppy disks, and optical data storage devices. The computer readable recording medium can also be distributed over network coupled computer systems so that the computer readable code is stored and executed in a distributed fashion.

According to the present invention, channel bits after BCA data modulation are generated by inserting a start pattern to data bits before modulation such that a separate modulation table is not needed. Accordingly, the recording density in the BCA increases and by using the start pattern, a sync pattern distinguishable from data is generated and can be used as a signal for a phase locked loop (PLL) when data is restored.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An information storage medium for use with a recording and/or reproducing apparatus comprising:
    a user data recording area; and
    a burst cutting area (BCA) on which control information is modulated by using an on-off keying (OOK) modulation and recorded for use by the apparatus in transferring data with respect to the user data recording area,
    wherein the OOK modulation method comprises converting 2-bit data into 3 channel bits and the first bit of the 3 channel bits converted by the OOK modulation comprises a start pattern indicating a beginning of the 2-bit data.

2. The information storage medium of claim 1, wherein a signal generated in the OOK modulation method is a return-to-zero (RZ) signal.

3. The information storage medium of claim 1, wherein when the start pattern is 0, 1's do not continuously occur in 3 bits or more of the channel bits, and when the start pattern is 1, 0's do not continuously occur in 3 bits or more of the channel bits.

4. The information storage medium of claim 1, wherein the start pattern is used by the apparatus in a phase locked loop (PLL) to restore data recorded in the BCA.

5. The information storage medium of claim 1, further comprising:
    a sync pattern used by the apparatus to distinguish the data bits, wherein the sync pattern comprises:
    a sync body including channel bits; and
    a sync identification (ID) to distinguish the sync pattern.

6. The information storage medium of claim 5, wherein the sync body comprises 6 channel bits and the sync ID comprises 6 channel bits.

7. A data modulation method comprising:
    generating control information modulated by using on-off keying (OOK) modulation method; and
    recording the generated control information on a burst cutting area (BCA),
    wherein the OOK modulation method comprises converting 2-bit data into 3 channel bits and the first bit of the 3 channel bits converted by the OOK modulation comprises a start pattern indicating a beginning of the 2-bit data.

8. A recording and/or reproducing apparatus comprising:
    a control unit which generates a control information modulated by using on-off keying (OOK) modulation method; and
    a recording unit which records information generated by the control unit on a burst cutting area (BCA) formed on an optical disk,
    wherein the OOK modulation method comprises converting 2-bit data into 3 channel bits and the first bit of the 3 channel bits converted by the OOK modulation comprises a start pattern indicating a beginning of the 2-bit data.

9. The apparatus of claim 8, wherein the control information is tracking polarity information.

10. The apparatus of claim 8, wherein the control information is reflection ratio information.

11. A reproducing and/or recording apparatus comprising:
    a reading unit which reads out control information generated by using on-off keying (OOK) modulation method, from a burst cutting area (BCA) of an optical disk; and
    a control unit which interprets information read by the reading unit, and based on the interpreted information, records user data on the optical disk or reproduces user data recorded on the optical disk,
    wherein the OOK modulation method comprises converting 2-bit data into 3 channel bits and the first bit of the 3 channel bits converted by the OOK modulation comprises a start pattern indicating a beginning of the 2-bit data.

12. A method of reproducing a burst cutting area (BCA) data comprising:
    detecting a starting pattern indicating a start of 2 bit data word;
    detecting 2 channel bits representing a data portion and indicating the 2-bit data word;
    identifying a sync pattern to reproduce a BCA data; and
    reproducing the BCA data in accordance with the sync pattern.

* * * * *